United States Patent [19]

Viola et al.

[11] Patent Number: 4,678,217
[45] Date of Patent: Jul. 7, 1987

[54] CARRIER TOOL

[75] Inventors: Frank J. Viola, Uniondale; Henry H. Hubner, Jr., Levittown, both of N.Y.

[73] Assignee: Parker Hannifin Corporation, Cleveland, Ohio

[21] Appl. No.: 861,116

[22] Filed: May 6, 1986

Related U.S. Application Data

[63] Continuation of Ser. No. 625,889, Jun. 29, 1984, abandoned.

[51] Int. Cl.[4] .......................... B65G 7/12; B66C 1/44
[52] U.S. Cl. ........................................ 294/16; 294/92; 294/118; 294/164; 294/903
[58] Field of Search ...................... 294/16, 903, 92, 28, 294/31.1, 62, 106, 117, 118, 113, 119, 164

[56] References Cited

U.S. PATENT DOCUMENTS

| 1,401,777 | 12/1921 | Heidt | 294/16 |
| 1,508,340 | 9/1924 | Kroening | 294/16 |
| 2,720,412 | 10/1955 | Kull | 294/92 |
| 3,820,837 | 6/1974 | Frederickson | 294/63 B |
| 4,032,181 | 6/1977 | Money, Sr. | 294/16 |
| 4,055,364 | 10/1977 | Breite | 294/63 B |
| 4,093,298 | 6/1978 | Gatewood | 294/118 |
| 4,215,889 | 8/1980 | Rayburn | 294/16 |

Primary Examiner—James B. Marbert
Attorney, Agent, or Firm—Joseph B. Balazs

[57] ABSTRACT

A tool for lifting and carrying an automotive battery and the like consists of a pair of identical sheet metal stampings in the form of L-shaped levers, pivotally joined for scissor-like action and interconnected by a carrying strap. The levers are generally planar and include a plurality of gripping teeth in a convexly curved configuration at the inner confronting faces of the L-shaped ends to provide variable spacing of the opposed operative teeth. The strap is a semi-rigid plastic and biases the levers to a partly closed position.

6 Claims, 7 Drawing Figures

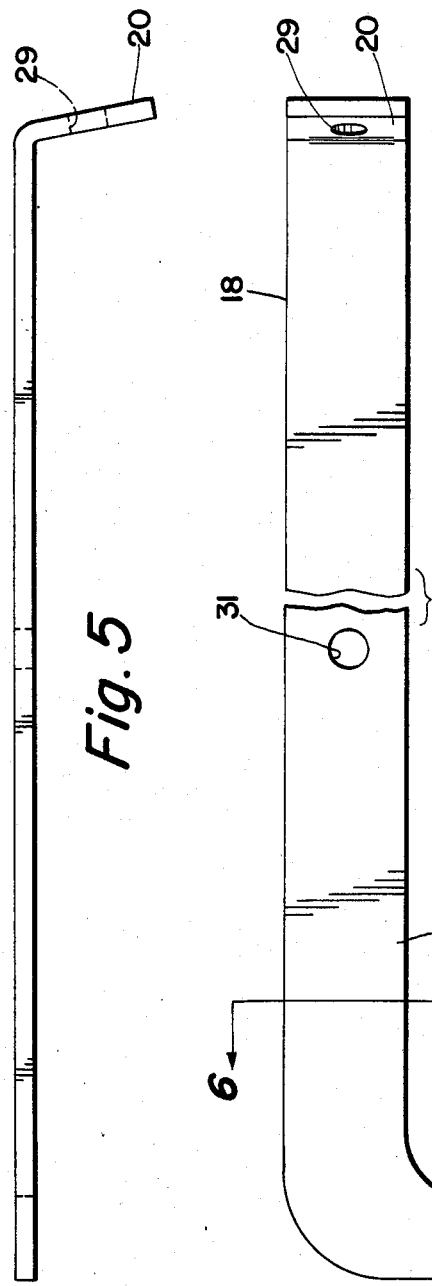
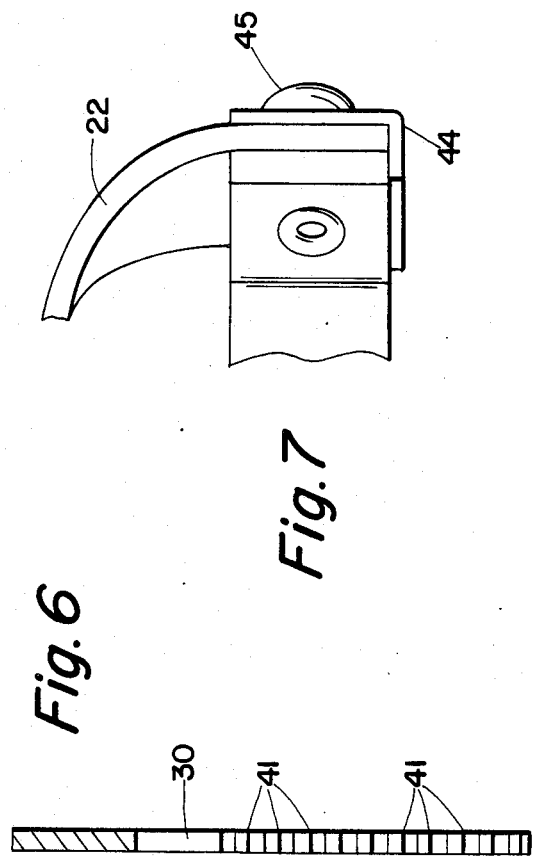

CARRIER TOOL

This application is a continuation of application Ser. No. 625,889, filed June 29, 1984, now abandoned.

BACKGROUND OF THE INVENTION

This invention relates to carrier tools and more particularly to a universal scissor-like tool for transporting automobile batteries and the like.

Battery carrier tools generally come in two basic types, these being the body gripping and terminal gripping styles. The top terminal gripping style has been around for many years, is safe, inexpensive and works well. With the advent of side terminal batteries, combination type tools have evolved. However, these usually are more expensive and result in carrying batteries in a tipped position, with the attendant possibility of acid spillage.

Body gripping carriers come in several different configurations and are advantageous in accommodating both top and side terminal batteries. Generally, however, they are relatively complex devices and fairly expensive. Also due to their complexity, if they are not properly utilized, then a dangerous situation could occur whereby a relatively heavy battery could be dropped or have the acid spilled, resulting in personal or property damage. Many of these prior art devices required some form of adjustment and, rather than risk the uncertainties of improper use, most mechanics prefer direct manual handling of the batteries and accept the inherent dangers of doing so.

Typical of prior art body gripping carriers is that shown in U.S. Pat. No. 4,215,889. Here there is disclosed a pair of levers with handles welded at one end and gripper members at the other. The grippers are plates with various forms of projections thereon for engaging the battery side walls without incurring damage thereto. The tool includes a slip joint pivot connection as a device for maintaining the gripper plates substantially parallel to the side walls of the battery.

Another form of a body gripping carrier is shown in U.S. Pat. No. 3,820,827. This device is of farily simplified structure and includes pivoted shoes for achieving flat engagement with the side walls of the battery. Such shoes are not designed for a friction grip, but rather engage the underside of a protruding rim at the top of the battery.

SUMMARY OF THE INVENTION

The instant invention is a low cost, non-adjustable, simplified carrier of the body gripping type which can accommodate a wide size range of batteries and is equally effective for top or side terminal styles. The carrier consists essentially only of a pair of identical sheet metal stampings which are pivotally joined and interconnected by a carrying strap. The stampings are levers having curved jaws at the battery engaging ends. The confronting convex curve of the jaws which includes a row of gripping teeth provides an inherent adjustment for different size batteries and control over the engagement forces. This then provides a readily usable structure which is reliable and safe to use and which will not cause damage to the batteries being carried.

BRIEF DESCRIPTION OF THE DRAWINGS

FIG. 4 is an elevational view, partly broken away, of one lever of the battery carrier of the invention;

FIG. 5 is a plan view, partly broken away of the lever of FIG. 4;

FIG. 6 is a view, partly in section, of the lever of FIG. 4, taken along the lines 6—6; and FIG. 7 is an enlarged partial view of a handle end of the battery carrier, showing the carrying strap attachment.

DESCRIPTION OF THE PREFERRED EMBODIMENT

Figure 1:
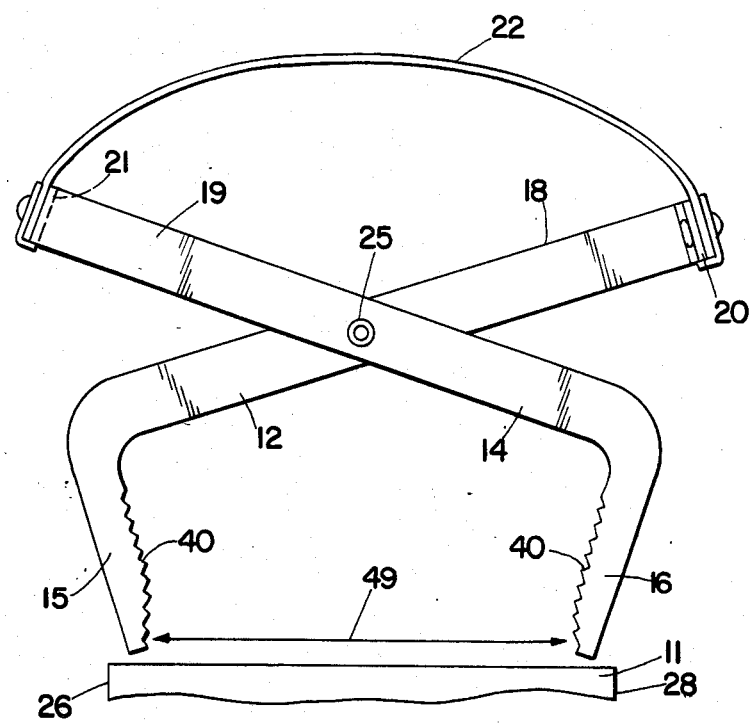
FIG. 1 is an environment view of the battery carrier of the invention, shown in a normal equilibrium condition and in relation to a battery.
Figure 2:
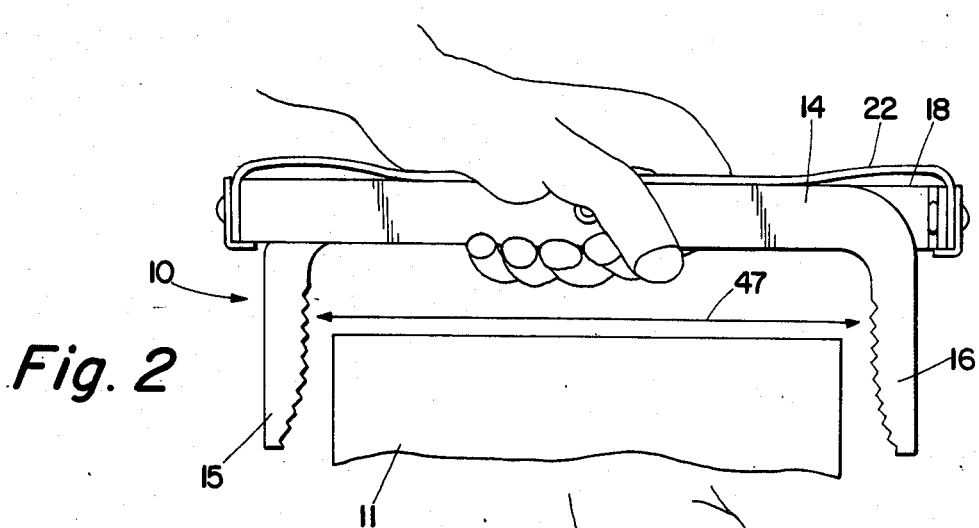
FIG. 2 is a view similar to that of FIG. 1, showing the battery carrier in an open position, preparatory to placement on a battery.
Figure 3:
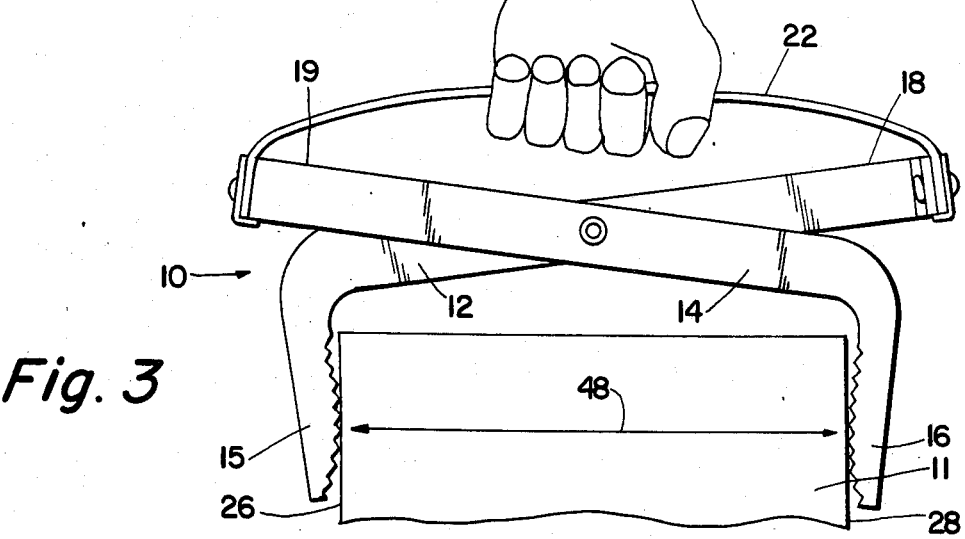
FIG. 3 is a view similar to that of FIGS. 1 and 2, showing the battery carrier in lifting engagement with the battery.

Referring now to the drawings and particularly FIGS. 1-3, the battery carrier 10 of the invention is shown in various stages of operation in relation to battery 11, which is to be grasped and carried. Battery carrier 10 comprises identical levers 12, 14 of L-shaped configuration, having respective jaws 15, 16 of one end and respective handles 18, 19 at the other end. The levers 12, 14 terminate at the handle end in respective bent tabs 20, 21 and are joined by carrying strap 22. The levers 12, 14 are also joined in a pivotal connection by rivet 25 at a location between the respective jaw and handle 15, 18 and 16, 19 of each lever.

In this arrangement it is clear that battery carrier 10 operates in a scissor-like manner in that jaws 15, 16 which are the short legs of L-shaped levers 12, 14 respectively, are pivoted toward and away from another about rivet 25, as handles 18, 19 are similarly pivoted. Handles 18, 19 may be pivoted by lifting or pushing down on strap 22 as seen in FIGS. 2 and 3, or may be moved in any other manner. Strap 22 is a straight length of semi-rigid plastic material formed in a curve due to affixation at the ends of handles 18, 19 as seen in FIG. 1. In attempting to resume its initial condition strap 22 biases jaws 15, 16 to a state of equilibrium with jaws 15, 16 in a relatively closed and yet spaced position.

As seen in FIG. 1, such equilibrium position of jaws 15, 16 is typically at a spacing smaller than the lateral dimension of battery 11 so that the jaws 15, 16 need to be opened to a greater dimension. In so doing strap 22 is further flexed and will produce a greater bias urging jaws 15, 16 against the battery side walls 26, 28, once carrier 10 is positioned as seen in FIG. 3. Opening of jaws 15, 16 may be accomplished in different ways. In one mode, strap 22 may be grasped by hand to support the battery carrier tool slightly above battery 11 as shown in FIG. 1. Battery carrier 10 will maintain substantially the same equilibrium condition depicted, but when moved further downward, one or the other of jaws 15, 16 will engage battery 11 and resist further movement. If carrier 10 is tilted slightly and urged further downward, the other of jaws 15, 16 will be moved to a more open positin until the lateral dimension of battery 11 is exceeded to allow jaws 15, 16 to slide down onto side walls 26, 28.

Another mode of operation is depicted in FIG. 2 wherein both strap 22 and pair of levers 12, 14 are manually grasped and substantially aligned, thereby pivoting jaws 15, 16 to a wide open position for placement over battery 11. Upon release of carrier 10, jaws 15, 16 will spring back into engagement with side walls 26, 28, under urging of strap 22, to assume the position depicted in FIG. 3. It will be apparent then, from the showing of FIG. 3, that as strap 22 is manually grasped and lifted, that handles 18, 19 will tend to close, as will jaws 15, 16, creating both a lifting and gripping force on battery 11.

Referring now more particularly to FIGS. 4-7, a clearer understanding of the principles of this invention may be obtained. There figures show in detail the structure of lever 12, removed from battery carrier 10, and are applicable as well to identical lever 14. Lever 12 consists of a sheet metal stamping of fairly substantial thickness to afford the necessary rigidity for handling batteries of the lead-acid variety and typically is formed of 0.125 inch thick cold rolled steel. Lever 12 is of extended length and includes jaw 15 at one end and handle 18 at the other. Jaw 15 forms the short leg of the L-shaped stamping and extends from the main length of lever 12 at substantially a right angle. Jaw 15 and lever 12 are coplanar, but the latter also includes a short tab 20 bent therefrom at somewhat less than a right angle. Tab 20 includes hole 29 therein for attachment of strap 22. Jaw 15 includes inner face 30 thereon which is the thin edge of jaw 15 between the jaw and lever 12. Lever 12 also includes aperture 31 in the central portion between jaw 15 and handle 18 for receipt of rivet 25 which joins levers 12 and 14.

As noted, jaw 15 extends from lever 12 at substantially a right angle in that outer face 32 of jaw 15 is so positioned. Inner face 30 also extends at substantially a right angle from lever 12 for a short distance but then blends into a convex curve 34 at junction 35, the curve having a center of curvature at point 36, on line with junction 35 and a radius depicted by arrow 38. Jaw 15 includes a plurality of teeth 40 at inner face 30, conforming to the straight line and convex curvature of inner face 30 and forming the gripper means of battery carrier 10.

Teeth 40 are formed by a series of transverse notches in jaw 15 resulting in a series of parallel transverse ridges 41 which are the peaks of teeth 40. Ridges 41 are orthogonal to the plane of lever 12, are substantially equally spaced as viewed in FIG. 6 and in part lie on convex curve 34. Teeth 40 are of right angle profile as best seen in FIG. 4 and preferably have a maximum radius at the peaks 41 thereof on the order of 0.010 inch. When lever 14 is joined to lever 12 the teeth 40 forming the gripper means on each lever will be confronting one another, although slightly laterally displaced by the side-by-side disposition of the levers, and will engage the respective side walls 26, 28 of a battery 11, when so positioned thereon.

Engagement of teeth 40 with battery 11 is limited however to relatively few teeth depending upon several parameters including the size of carrier 10, number and spacing of teeth 40 thereon, radius of curve 34, angle of jaws 15, 16 relative to levers 12, 14, size and weight of battery 11, composition of side walls 26, 28 thereof, and yet other factors. Since primarily a frictional grip is being achieved upon batter 11, many of these parameters have been optimized for the usual forms of battery in order to achieve a firm grip without damage to the battery 11. Thus, for example, if the radius of curve 34 of inner face 30 of jaw 12 were reduced, teeth 40 might penetrate battery 11 too deeply, while if increased perhaps only a single tooth 40 would engage when lifting narrow batteries. It is preferable that engagement be made by a few teeth 40 so that forces can be spread and so that a good degree of stability is obtained. As noted, as jaws 15, 16 are pivoted toward and away from one another, different sets of teeth 40 will become operatively opposed to one another, that is, most closely spaced, for gripping purposes. These operatively opposed sets of teeth 40 will occur more outwardly from the straight portion of inner face 30, along convex curve 34 as jaws 15, 16 are closed toward one another. Thus, it may be seen in FIG. 2 that operatively opposed teeth 40, as depicted by arrow 47, are closest to levers 12, 14 when jaws 15, 16 are opened wide. In FIG. 3, the operatively opposed teeth 40 are depicted by arrow 48 in the central portion of jaws 15, 16 when the jaws 15, 16 are in an intermediate position. In FIG. 1, arrow 49 depicts the operatively opposed teeth 40 at the outer end of the set of teeth 40 when jaws 15, 16 are in their closest useful position.

For purposes of description, the preferred size of battery carrier 10 is provided which has been determined as best suited for lifting batteries 11 having a case width between side walls 26, 28 on the order of 5 to 7 inches. In such configuration, the clamping force achieved is about three times the weight of the battery for the widest battery 11, while maintaining a clamping force for narrowest batteries on the order of equal to the weight of the battery 11. Larger clamping forces risk battery damage while lower forces become unsafe in not achieving sufficient frictional grip. This is a particular problem with typical slippery plastic battery cases now in use.

Preferred overall lever 12 length is on the order of 8.25 inches while overall jaw 15 length is 3.25 inches. Lever 12 is 0.125 inches thick and 0.75 inches in width while the distance to junction 35 from the closest edge of lever 12 is 1.25 inches. Radius 38 of curve 34 is on the order of 2.8 inches with seven ridges 41 of teeth 40 on curve 34 and four ridges 41 on the straight portion of inner face 30. The spacing between ridges 41 is on the order of 0.19 inch. Tab 20 is on the order of 0.9 inch in length while strap 22 is about one inch in width and about 0.125 inch thickness. Strap 22 is preferably polyvinylchloride material and is secured to respective tabs 20, 21 by means of a sheet metal clip 44 in the form of a right angle and rivet 45. By this connection, the major width of strap 22 thus lies generally in the curve of a cylinder having an axis generally orthogonal to the plane of levers 12, 14 to produce a restoring bias for jaws 15, 16.

We claim:

1. A tool for carrying an automotive battery and the like, comprising:
   a pair of levers, each of said levers having a gripping jaw at one end and a handle at the other end, each of said levers being formed of a rigid plate wherein each said jaw lies substantially in a common plane with said respective lever;
   means connecting said pair of levers at a single pivot location between said jaw and handle in side by side disposition for pivotal movement of said jaws toward and away from one another, said jaws extending at substantially a right angle relative to said respective levers, and having respective confronting inner faces formed of the edge of said respective jaw transverse to the plane of and adjacent said lever, said levers being connected with said handle of each said lever adjacent said jaw of the other said lever so that said levers may be moved to a substantially parallel, side by side disposition with said jaws extending substantially parallel to one another in a fully spaced disposition adapted for placement adjacent the sides of said automotive battery;

gripper means in a convex curvature extending along a portion of said inner face of each of said jaw, each said gripper means being curved substantially in the plane formed by said respective jaw and lever, each said gripper means comprising a plurality of teeth distributed along said respective inner face, whereby as said jaws are pivotally moved toward and away from one another, different teeth of said gripper means will become operatively opposed, at different spacings from one another, for gripping purposes, said gripper means extending transversely substantially no further than the thickness of said plate to provide the sole means for gripping engagement of said automotive battery; and means biasing said jaws toward one another for gripping the sides of an automotive battery therebetween, said biasing means comprising a semi-rigid strap fixedly attached to said handles of said levers in a manner to urge said jaws to a partially closed position and serving as a handle for said tool.

2. The tool as set forth in claim 1 wherein said teeth have substantially parallel ridges thereon disposed transverse in the plane of said gripping jaw.

3. The tool as set forth in claim 2 wherein said teeth are substantially evenly spaced along the length of said gripping jaw and the profile of said teeth is substantially in a right angle configuration.

4. The tool as set forth in claim 1 wherein said levers are metal plates and said strap is flexible plastic.

5. The tool as set forth in claim 4 wherein said strap is polyvinylchloride material.

6. The tool set forth in claim 1 further including tabs at said handles to which said strap is connected, said tabs extending transversely to the plane of said respective levers, said strap being connected to each of said tabs, thereby to urge said tabs to a predetermined position in which said jaws are partially closed.

* * * * *